(12) United States Patent
Zhou

(10) Patent No.: US 8,040,426 B2
(45) Date of Patent: Oct. 18, 2011

(54) AUTOMATIC FOCUSING MECHANISM

(75) Inventor: Chao-hui Zhou, Beijing (CN)

(73) Assignee: China Mobile Internet Technologies Inc., Shenyang, Liaoning (CN)

( * ) Notice: Subject to any disclaimer, the term of this patent is extended or adjusted under 35 U.S.C. 154(b) by 620 days.

(21) Appl. No.: 11/937,097

(22) Filed: Nov. 8, 2007

(65) Prior Publication Data

US 2008/0062301 A1    Mar. 13, 2008

(51) Int. Cl.
G03B 13/00 (2006.01)
H04N 5/225 (2006.01)
G03B 17/00 (2006.01)
G02B 15/14 (2006.01)
G02B 7/02 (2006.01)

(52) U.S. Cl. ............ 348/345; 348/361; 396/77; 396/79; 359/698; 359/824

(58) Field of Classification Search .................. 348/345, 348/340, 335, 361; 396/79, 75, 133; 359/824, 359/698
See application file for complete search history.

(56) References Cited

U.S. PATENT DOCUMENTS

| 4,558,367 A * | 12/1985 | Urata et al. ................ 348/350 |
| 5,101,278 A * | 3/1992 | Itsumi et al. ................ 348/357 |
| 6,487,669 B1 | 11/2002 | Waring |
| 7,327,952 B2 * | 2/2008 | Enomoto ..................... 396/55 |
| 2003/0043478 A1 | 3/2003 | Choi et al. |
| 2004/0184163 A1 * | 9/2004 | Nishioka et al. .............. 359/726 |
| 2004/0201074 A1 * | 10/2004 | Khandros et al. ............. 257/459 |
| 2006/0125950 A1 * | 6/2006 | Chen ............................. 348/345 |

FOREIGN PATENT DOCUMENTS

| CN | 1139771 A | 1/1997 |
| CN | 1330345 A | 1/2002 |
| CN | 1368658 | 9/2002 |
| CN | 22672677 | 1/2005 |
| EP | 0714202 A | 3/2006 |
| JP | 62269576 | 11/1987 |
| JP | 8029676 A | 2/1996 |
| JP | 11175205 A | 7/1999 |
| JP | 2000295831 | 10/2000 |
| JP | 2003110929 A | 4/2003 |

* cited by examiner

Primary Examiner — Lin Ye
Assistant Examiner — Mekonnen Dagnew
(74) Attorney, Agent, or Firm — Joe Zheng

(57) ABSTRACT

An automatic focusing mechanism comprises a plurality of lenses and an image sensor disposed along an optical axis, an electromagnetic driving device for generating an electromagnetic force to drive the image sensor to move along the optical axis, and a position-limited device for limiting the movement of the image sensor along the optical axis. The image sensor is driven by the electromagnetic force and moved along the optical axis, and the distance between the lenses and the image sensor is properly adjusted, thereby realizing automatic focusing.

18 Claims, 6 Drawing Sheets

V shape    W shape
s

AUTOMATIC FOCUSING MECHANISM

FIELD OF THE INVENTION

The present invention is generally related to an automatic focusing mechanism, and more particularly related to an automatic focusing mechanism driven by an electromagnetic force.

DESCRIPTION OF THE RELATED ART

Automatic focus is a technique widely used in many imaging equipments such as cameras, camcorders, mobile-telephones and devices with video capturing capabilities. Since devices with portability capability are increasingly desired by users, the trends of an automatic focusing mechanism in such devices are moving towards smaller form factor and lighter weight. The automatic focusing mechanism in a conventional method generally utilizes a motor to control the lens group to move along an optical axis so as to change the distance between the lens group and the sensor (such as CCD or CMOS). However, because of the size of the motor, it is difficult to further reduce the size of the focusing mechanism.

There are many automatic focus techniques proposed without using a motor diver, such as using an electromagnetism force inducing from an electromagnetic field to drive the lens group. FIG. 1 duplicates a drawing in a Chinese patent publication No.: CN1203362C that includes a sensor 11, a base plate 12, a sensor housing 13, a light filter 14, an elastic part 16, lens 17, a lens vane 18, a winding coil 19 and a magnet 20. The wire at the outside of the elastic part 16 is connected to the electrical wire so as to provide an electric current. The current via the elastic part 16 feeds into a roll-type coil twisting onto the outside of lens vane 18. The electromagnetism force can be produced by the interaction between the magnetic field inducted from the coil and the magnet 20 connected around the coil 19 or the inherent field by the permanent magnetic, then forcing the lens vane 18 to move up or down. Thus, the distance between the lens 17 fixed on the lens vane 18 and image sensor 11 can be adjusted.

The prior art as described above takes out the motor and utilizes the electromagnetism force to move the lens group, so it may reduce the size of the focusing mechanism at a certain level. However, it needs a fixed mechanism that combines the lens group and the magnet or coil so as to drive the lens moving in synchronization. To keep the optical path unblocked, the fixed mechanism could only be positioned on the side of the lens group, which not only increases the difficulty to assemble such a fixed mechanism but also makes it difficult to further reduce the size of the focusing mechanism.

SUMMARY OF THE INVENTION

This section is for the purpose of summarizing some aspects of the present invention and to briefly introduce some preferred embodiments. Simplifications or omissions in this section as well as the title and the abstract of this disclosure may be made to avoid obscuring the purpose of the section, the title and the abstract. Such simplifications or omissions are not intended to limit the scope of the present invention.

Generally speaking, techniques for automatic focusing using an electromagnetic force are disclosed. An automatic focusing mechanism comprises a plurality of lenses and an image sensor disposed along an optical axis, an electromagnetic driving device for generating an electromagnetic force to drive the image sensor to move along the optical axis, and a position-limited device for limiting the movement of the image sensor along the optical axis. The image sensor is driven by the electromagnetic force and moved along the optical axis, and the distance between the lenses and the image sensor is properly adjusted, thereby realizing automatic focusing.

The present invention may be implemented in various forms including a method, an apparatus or a part of a system. According to one embodiment, the present invention is an automatic focusing mechanism comprising: a lens group arranged along an optical axis; an image sensor arranged along the optical axis; an electromagnetic driver for inducing an electromagnetic force to drive the image sensor to move along the optical axis; and a spacing restrictor for limiting an movement of the image sensor along the optical axis.

One of the objects in the present invention is to make it possible to further reduce the size and weight of the focusing mechanism.

Another one of the objects in the present invention is to provide low noise in the operation of automatic focus.

Yet another one of the objects in the present invention is to provide a simple mechanism movement and fast speed in focusing adjustment.

Other objects, features, and advantages of the present invention will become apparent upon examining the following detailed description of an embodiment thereof, taken in conjunction with the attached drawings.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE PREFERRED EMBODIMENTS

The detailed description of the invention is presented largely in terms of procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth in order to provide a thorough understanding of the present invention. However, it will become obvious to those skilled in the art that the present invention may be practiced without these specific details. In other instances, well known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks or steps in process flowcharts or diagrams representing one or more embodiments of the invention do not inherently indicate any particular order nor imply any limitations in the invention.

Figure 3:
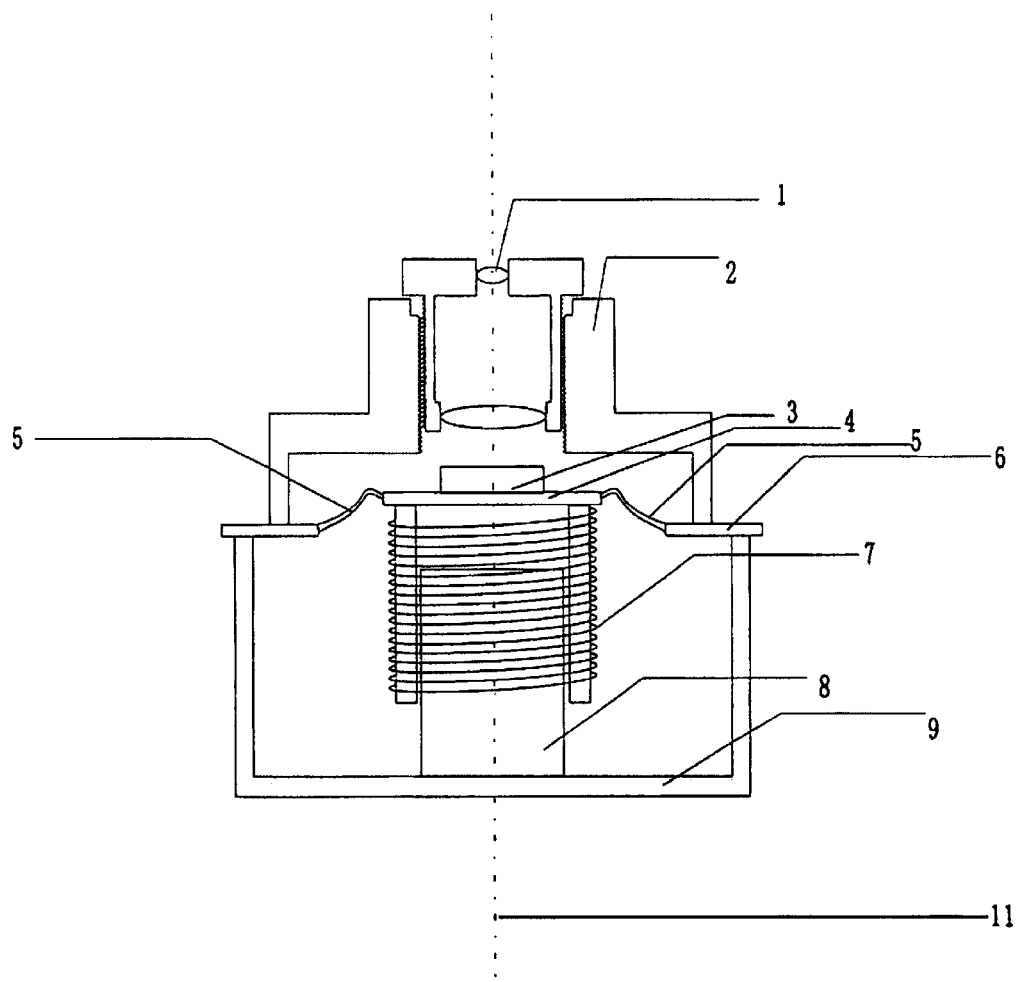
FIG. 3 is a cross-sectional view of an exemplary automatic focusing mechanism according to one embodiment of the present invention.
Figure 4:
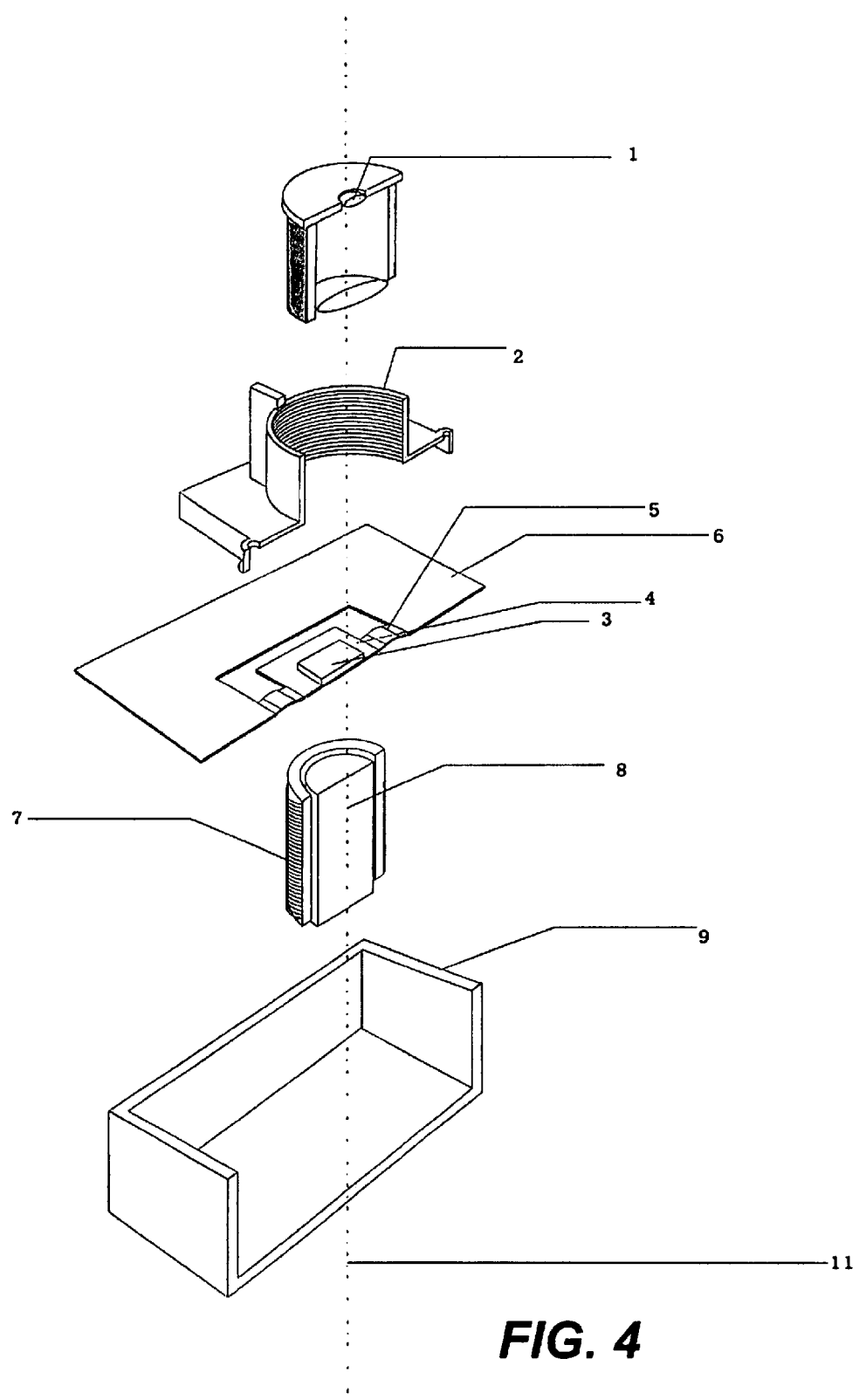
FIG. 4 is an exploded view of the automatic focusing mechanism of FIG. 3.

Referring now to the drawings, in which like numerals refer to like parts throughout the several views. FIG. 3 shows a cross-sectional view of an exemplary automatic focusing mechanism according to one embodiment of the present invention. FIG. 4 shows the corresponding exploded view of the automatic focusing mechanism of FIG. 3. The embodiment in FIG. 3 or 4 includes a lens group 1, a lens sleeve 2, an image sensor 3, a PCB (printed circuit board) substrate 4, a flexible PCB 5, an external PCB 6, a drive coil 7, a permanent magnetic 8 and a base frame 9.

The lens group 1 is fixed inside the lens sleeve 2. The position of the lens sleeve 2, the external PCB 6 and the base frame 9 form a housing. In one embodiment, the lens sleeve 2, the external PCB 6 and the base frame 9 are rigidly positioned to act like an enclosed empty cavity. An optical path passes only into such a cavity through an aperture on the front of the lens sleeve 2. The lens group 1 and image sensor 3 are positioned along an optical axis 11, and both of them are collimated with the aperture center. The image sensor 3 is soldered on the PCB substrate 4, and its center is aligned with the optical axis 11. The drive coil 7 is fixed on one side of the PCB substrate 4 but on the opposite side the image sensor 3 is assembled. The drive coil 7 also movably surrounds the permanent magnetic 8. The flexible PCB 5 is welded between the PCB substrate 4 and the external PCB 6 respectively. One end of the flexible PCB 5 being connected to the PCB substrate 4 is connected to both the image sensor 3 and drive coil 7 so as to transmit the electrical signals of the image sensor 3 and supply a driving current to the drive coil 7.

Figure 5A:
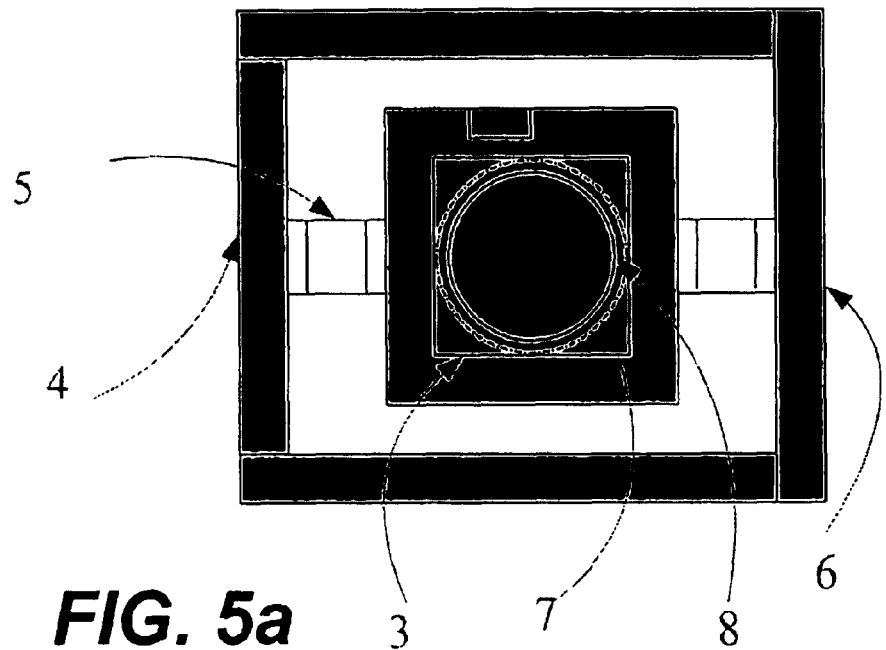
FIGS. 5a and 5b show different numbers of flexible PCBs being assembled on the automatic focusing mechanism of FIG. 3.
Figure 5B:
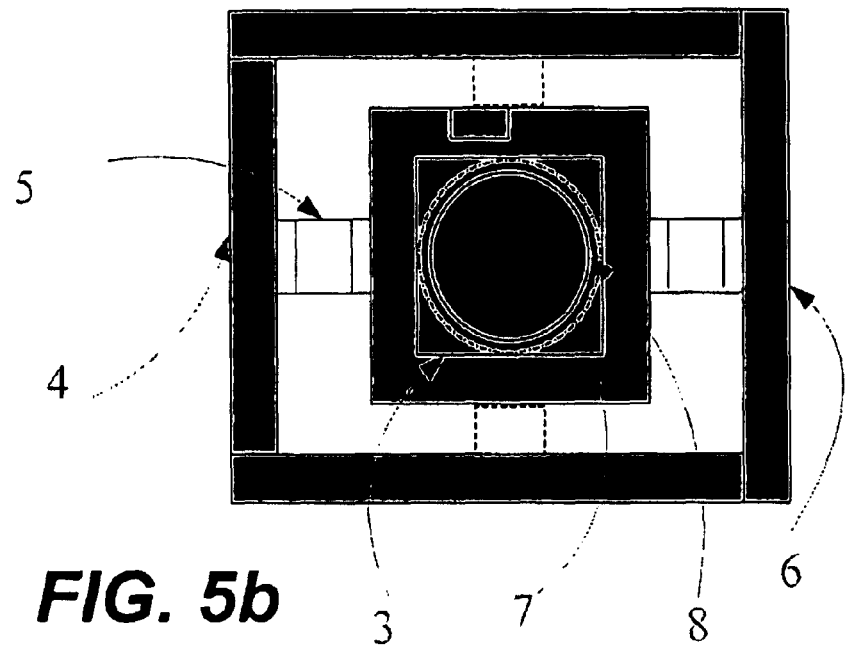

The flexible PCB 5 provides the function of extending the PCB substrate 4 electronically as well as keeping the position of the image sensor 3. To prevent the center of image sensor 3 from deviating from the optical axis 11 in a focusing operation, the orientation of a resultant force from the distortion of the flexible PCB 5 should point along the optical axis 11. This can be solved by deploying two or four flexible PCBs in a symmetrical pattern as illustrated in FIGS. 5a and 5b, respectively. Additionally, the center of the image sensor 3 integrated with the PCB substrate 4 and the center of the drive coil 7 should be coincided with the optical axis 11.

Figure 6:
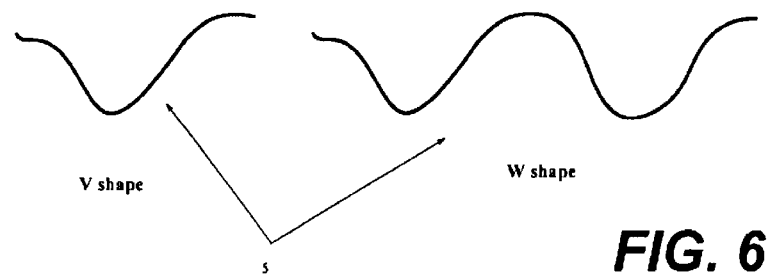
FIG. 6 illustrates different shapes of the flexible PCB of the automatic focusing mechanism of FIG. 3.

The flexible PCB 5 used in one embodiment is a type of printed circuit board that provides flexibility and distortion with repeatability. Examples of such a printed circuit board is a type of flexible PCB named after Mil-P-50884-Type-1, provided by Mod-tronic Instrument Ltd. in US, and manufactured by the way of sandwiching a copper thin sheet into a polyimide layer. In one embodiment, its thickness of the flexible PCB 5 is about 0.14 millimeter. The more distortion a flexible PCB presents, the stronger the force is generated from the flexible PCB. To enhance the distortion magnitude when the PCB is pressed, the flexible PCB may be bent into a V-shape, a W-shape or a multi-pleat shape illustrated respectively in FIG. 6. When the flexed flexible PCB is being pressed, the bending angles change, resulting in the flexible PCB being stretched or distorted thus to cause a movement.

Figure 1:
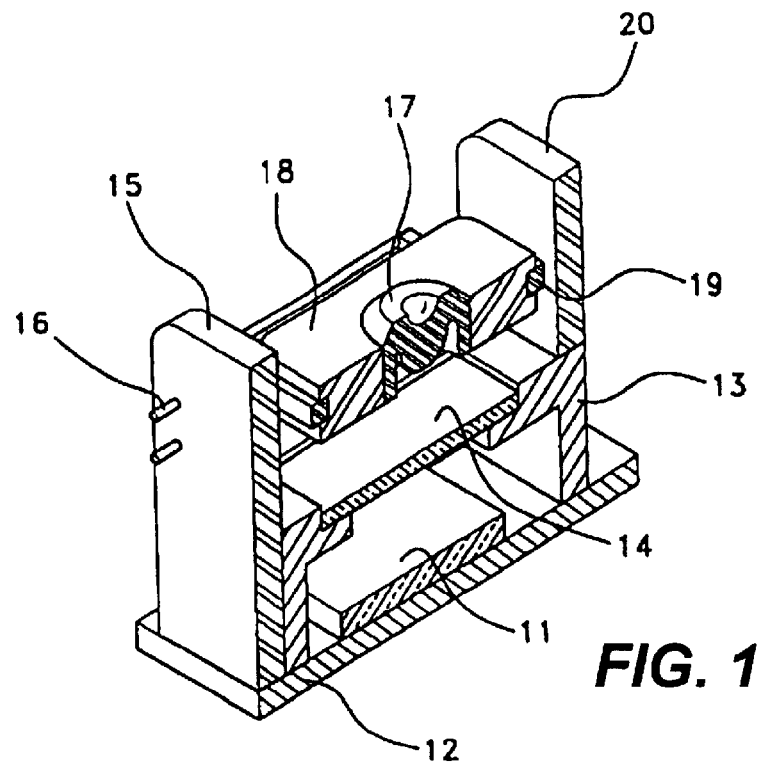
FIG. 1 is a perspective view of an automatic focusing apparatus according to a prior art system.
Figure 2:
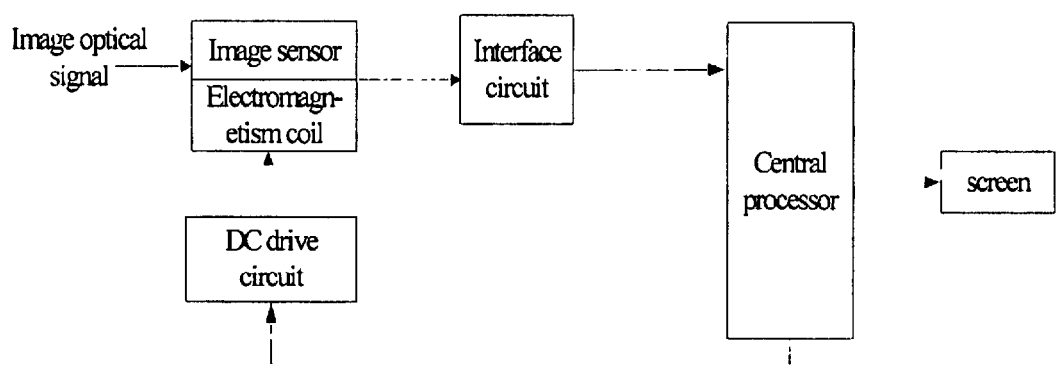
FIG. 2 is a block diagram of an exemplary auto-focus control part according to one embodiment of the present invention.

In operation, the positions of the lens group 1, the permanent magnetic 8 and the external PCB 6 are relatively fixed. The image sensor 3 is driven by the electromagnetic force inducted from the permanent magnetic 8 and the drive coil 7, moving along the optical axis to achieve focusing. As shown in FIG. 2, light signals of images pass through the lens group 1 and are focused onto the image sensor 3. The optical image is converted to the digital image signal by the image sensor 3, where the digital image is synchronized horizontally and vertically. Such a digital image signal is transmitted to the external PCB 6 via the flexible PCB 5, and arrives to a central processor (such as a digital signal processor or a CPU of a PC) via other interface circuits. The central processor is configured not only directly to display the digital image signal on a display screen but also judge whether the digital imaging system is focused. If the image is out of focus, the central processor outputs a control signal which is transformed into a positive or a negative DC voltage by a direct current drive circuit and such a DC voltage will act onto the drive coil 7. Based on the right-hand rule in electromagnetism, the coil inducts an electromagnetic field with S or N polarity whose direction is decided by the direction of the current. The interaction between the electromagnetic field and the permanent magnetic 8 can cause a force to move the image sensor 3 up and down or back and forward along the optical axis so as to adjust a distance between itself and the lens group 1.

To balance the movement of the image sensor 3, the flexible PCB 5 provides an elasticity force that acts as a function of counterbalance. The distortion magnitude of the flexible PCB 5 is increased with the increased electromagnetic force. The elasticity force and the electromagnetic force are balanced with each other to guarantee the image sensor 3 to be fixed at a position. At the same time, the symmetrical positions of the flexible PCBs prevent the center of image sensor 3 from deviating from the optical axis in a focusing operation. Because the current in the coil can be continuously adjusted, a high precision of optical focusing can be achieved.

Figure 7:
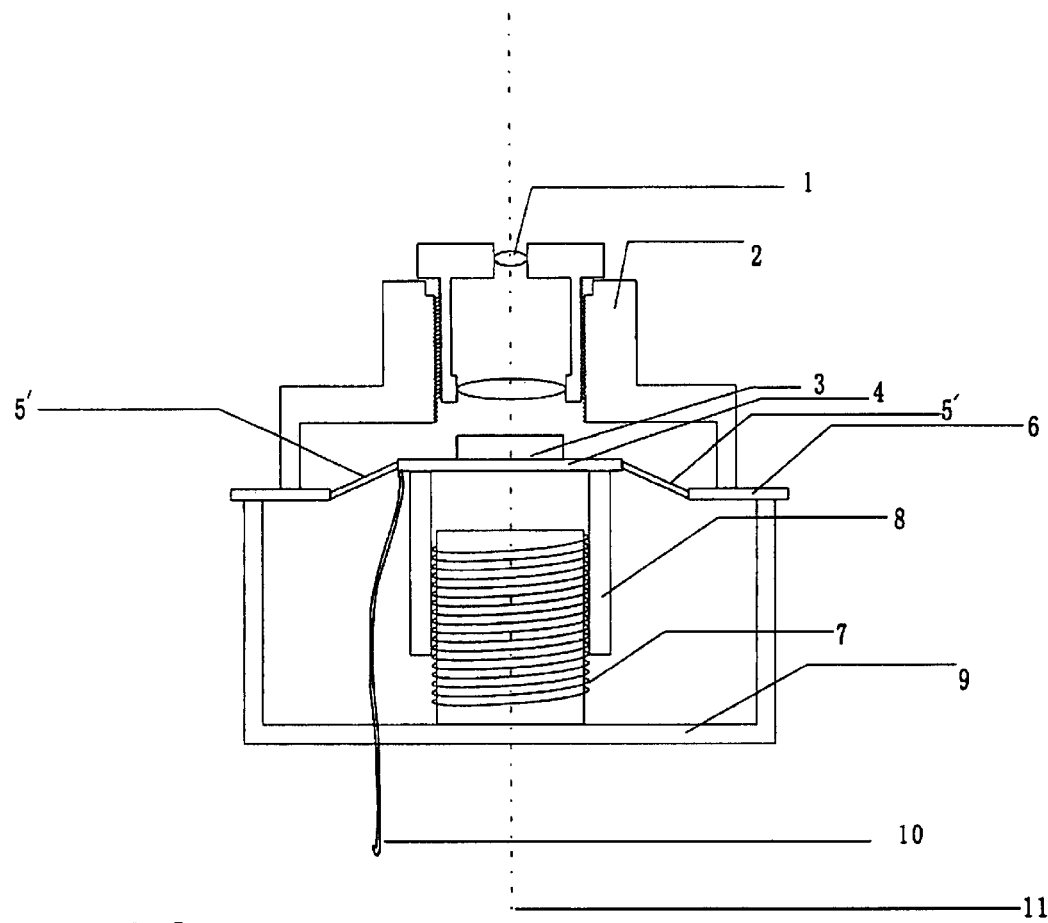
FIG. 7 is a cross-sectional view of an automatic focusing mechanism according to another embodiment of the present invention.

FIG. 7 shows another embodiment in which one side of a spacing restrictor, a flexible film 5', is connected between the PCB substrate 4, and the external PCB 6. Depending on an exact implementation, the flexible film 5' may be made from polyester, nylon, rubber or polyamine. To prevent the center of image sensor 3 from deviating from the optical axis in a focusing operation, the orientation of the combined forces generating from the distortion of the flexible film 5' should be aligned along the optical axis. Similar to the embodiment of FIG. 3, two or four flexible film 5' may be positioned around the image sensor 3 in a symmetric pattern so that the orientation of the combined forces generating from the distortion of the flexible film 5' are collimated along the optical axis.

In operation, the flexible film 5' is caused to be tensed or released so the center of the image sensor 3 can be located securely along the optical axis 11. It should be noted that the flexible film 5' is not to be distorted in a sense of it being bent into a V-shape, a W-shape or a multi-pleat shape. The flexible film 5' is only to be stretched. Since the flexible film 5' does not provide the electronic connections, a set of flexible wires 10 is provided in this embodiment to control the image sensor and to lead the image signals out therefrom. The permanent magnet 8 is fixed on one side of the PCB base plate 4 on which the image sensor 3 is settled. The coil 7 is fixed on the base frame 9, and the permanent magnet 8 is movably mounted around the coil 7.

In operation, the position between the lens group 1, the drive coil 7 and the external PCB 6 are properly disposed, and the image sensor 3 is driven by the electromagnetism force inducted from the permanent magnetic 8 and the drive coil 7, periodically oscillating along the optical axis. The magnitude of moving the image sensor 3 should cover a range that all scenes can be focused onto the image sensor 3 (e.g., between one and two focal lengths when there is a single lens in a lens group), and its oscillating period should be longer than the exposure time of the image sensor 3 to guarantee the exposure stability. In one embodiment, the oscillating period is made 100 times longer than the exposure time. The light signal is impinged upon the oscillating image sensor 3 via lens group 1, and the image signal is generated and transmitted to the external PCB 6 via the wire set 10, and it arrives to the central processor (such as a DSP in a digital camera or a CPU in a PC) via other interface circuitry.

Figure 8:
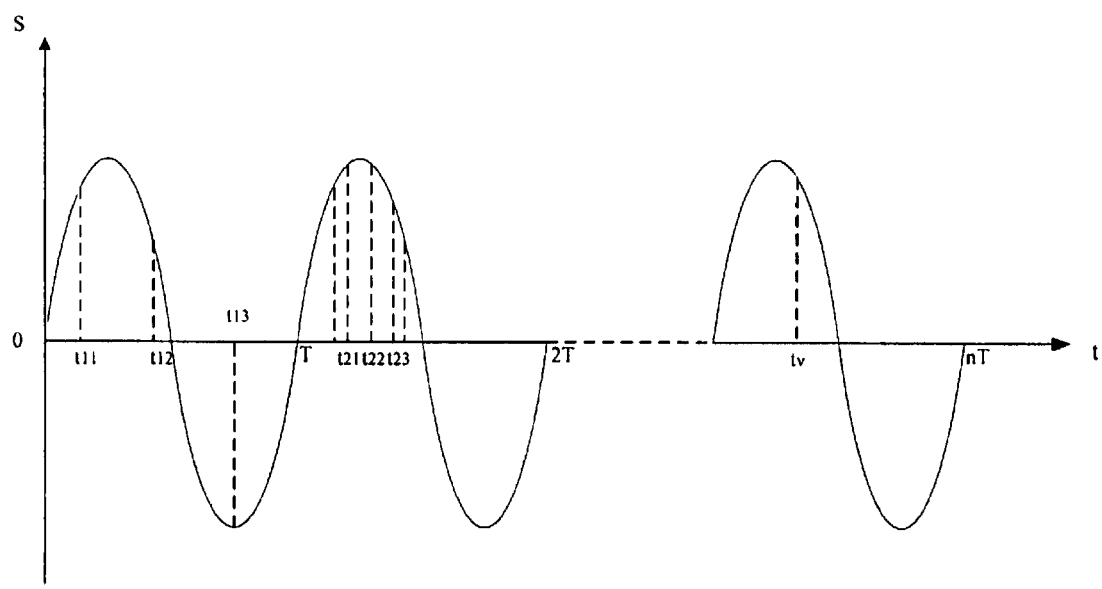
FIG. 8 is a block diagram showing an automatic focusing algorithm used in the automatic focusing mechanism of FIG. 7.

In one embodiment, the drive current in this embodiment is provided with a fixed period. The movement of the image sensor 3 along the optical axis is substantially the same in each period. The central processor periodically samples and processes the received digital image signal for calculating an optimal focalized time point. FIG. 8 shows an automatic focus algorithm adopted in this embodiment, where the horizontal axis stands for time t, and the vertical axis represents the displacement s of the image sensor 3. In the first oscillation period, the digital image signals are obtained at t=0 and other time intervals $t_{11}$, $t_{12}$ and $t_{13}$, respectively. Then the processor is configured to judge whether the image is a focalized one at the time nodes by a degree of the image sharpness or blurring. If the image is out of focus, the processor is configured to compute where the focalized point should be supposed to present in which time intervals among $0\sim t11$, $t11\sim t12$, $t12\sim t13$, $t13\sim T$ (The image at T is similar to the one at 0). In the next oscillation period, the process reselects the digital images in narrowed range, for example, at the three moments of t21, t22, t23 which are located near the time interval where the focusing point is likely to occur (e.g., $t_{11}\sim t_{12}$), which is estimated from the previous period. Repeatedly judging whether the image is focused at the moment $t_{21}$, $t_{22}$, $t_{23}$, the focusing point can be located in terms of the time interval. If the image is still out of focus, then the processor is configured to reevaluate the focalized point supposed to present in the time intervals $t_{11}\sim t_{21}$, $t_{21}\sim t_{22}$, $t_{22}\sim t_{23}$ and $t_{23}\sim t_{12}$. Similar operation may be repeated until a reasonable focalized point and corresponding moment $t_\nu$ are obtained. Subsequently, the focused photograph may be taken at the $t_\nu$ moment in the next period.

One of the features in the focusing algorithm used in this embodiment is a one-to-one mapping relationship between the displacement of the image sensor 3 and each of the sampled moments in a period. Because of the unique structure to control the movement of the image sensor in the embodiment, this one-to-one mapping relationship is to be maintained in all periods. Hence, as long as the accurate moment $t_\nu$ in focus is found in a period, the focusing operation is essentially finished. It may also be noticed that there is no need to adjust the current in the drive coil by judging the defocused degree to change the distance between the lens group 1 and the image sensor. Compared with the focusing mechanism by changing the drive current, the operation of this embodiment is simple, although it needs the image sensor 3 to expose constantly or in movement. To ensure the clear imaging, the oscillating period is limited by the exposure time, so does the focusing time. This embodiment is effective with a short exposure time, such as CCD image sensor, high-speed camera or other applications without a high demand for a focusing time.

It should be noted that other focusing algorithms may be used to accomplish the focusing operation, such as exposure at each moment when the oscillating amplitude almost turns to the maximum, and changing the oscillating magnitude by altering the value of the drive current. Although in a sense this approach is similar to the embodiment of FIG. 3, the difference is that the exposure process is operated in a static state in the embodiment of FIG. 3 while the exposure process of the embodiment of FIG. 7 is at the moment that the sensor may be still moving (the moving speed at the position of the maximum magnitude is the slowest in all movements).

As a spacing restrictor, the flexible film 5' provides an elasticity force that is as a function of counterbalance from the mechanic perspective. The distortion magnitude of the flexible film 5' enhances with the increased electromagnetic force. The varying process of the resultant force from the elasticity and electromagnetism force decides the movement of the image sensor 3 along the optical axis. At the same time, the symmetrical arrangement of the flexible film 5' prevents the center of the image sensor 3 from deviating from the optical axis in a focusing operation.

One of the features in the present invention is that the gravitation of the image sensor 3 integrated with the corresponding accessories is much smaller than the electromagnetism force and the elastic force from the distortion of the flexible PCB 5 or the flexible film 5'. Therefore, the automatic focusing mechanism in the present invention would not result in an offset when the gravitation direction is not aligned with the optical axis, and the offset between the center of the image sensor 3 and the optical axis also can be avoided.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. While the embodiments discussed herein may appear to include some limitations as to the presentation of the information units, in terms of the format and arrangement, the invention has applicability well beyond such embodiment, which can be appreciated by those skilled in the art. Accordingly, the scope of the present invention is defined by the appended claims rather than the forgoing description of embodiments.

I claim:

1. An automatic focusing mechanism comprising:
   a lens group arranged along an optical axis;
   an image sensor on one side of a substrate arranged along the optical axis;
   an electromagnetic driver for inducing an electromagnetic force to drive the image sensor to move along the optical axis, the electromagnetic driver including a magnet and a drive coil surrounding the magnet to create the electromagnetic force, wherein an opposite side of the substrate includes at least a pair of elongated structures extended from the opposite side of the substrate to hold up the drive coil surrounding the magnet to facilitate a relative movement between the magnet and the drive coil, and the magnet, the drive coil and the image sensor are coaxially positioned; and
   a spacing restrictor coupled to the image sensor to prevent the image sensor from moving off the optical axis.

2. The apparatus as claimed in claim 1, wherein the electromagnetic force causes the image sensor on the substrate to make a relative movement with respect to the lens group to achieve a focused image onto the image sensor.

3. The apparatus as claimed in claim 2, wherein the substrate is a printed circuit board (PCB), the spacing restrictor is an elastic member, one end of the elastic member is connected to the substrate and the other end of the elastic member has a fixed position relative to the lens group to physically hold up the substrate that makes the relative movement caused by the electromagnetic force.

4. The apparatus as claimed claim 2, wherein a center of the image sensor, a barycenter of an integration combining the image sensor with the PCB, a circle center of the drive coil are all located along the optical axis.

5. The apparatus as claimed in claim 2, wherein the magnet is columned, and the drive coil movably encloses around the magnet.

6. The apparatus as claimed in claim 2, further comprising a lens sleeve to position the lens group, an external PCB and a base frame, the lens sleeve, the external PCB and the base frame forming an housing to enclose the image sensor.

7. The apparatus as claimed claim 3, wherein the elastic member comprises a polyester film member, a nylon film member, a rubber film member or a polyimide film member.

8. The apparatus as claimed in claim 3, wherein the elastic member is substantially evenly distributed around the image sensor.

9. The apparatus as claimed in claim 3, wherein the drive coil is firmly fixed on the opposite side of the PCB, the magnet is columned on a base frame, and the drive coil movably encloses the magnet when the relative movement happens.

10. The apparatus as claimed in claim 7, further comprising a set of flexible wires for controlling the image sensor and leading the signals out therefrom.

11. The apparatus as claimed claim 3, wherein the elastic member includes a flexible PCB, the one end of the flexible PCB being connected to the image sensor is provided for transmitting signals of the image sensor.

12. The apparatus as claimed claim 11, wherein the one end of the flexible PCB being connected to the image sensor is provided for electrically connecting with the drive coil so as to provide the drive coil with a driving current.

13. The apparatus as claimed in claim 11, wherein the flexible PCB is bent into a V-shape, a W-shape or a multi-pleat shape.

14. The apparatus as claimed in claim 11, wherein the flexible PCB is provided around the image sensor in a substantially symmetrical pattern.

15. An automatic focusing mechanism comprising: a lens group arranged along an optical axis; an image sensor on one side of a substrate arranged along the optical axis;

an electromagnetic driver for inducing an electromagnetic force to drive the image sensor to move along the optical axis, the electromagnetic driver including at least a pair of elongated magnets and a drive coil to create the electromagnetic force, wherein the elongated magnets are mounted on an opposite side of the substrate and extended from the opposite side of the substrate to movably surround the drive coil; and a spacing restrictor coupled to the image sensor to prevent the image sensor from moving off the optical axis, wherein the spacing restrictor includes an elastic material.

16. The apparatus as claimed in claim 15, wherein the electromagnetic force causes the image sensor on the substrate to make a relative movement with respect to the lens group to achieve a focused image onto the image sensor.

17. The apparatus as claimed in claim 16, wherein the substrate is a printed circuit board (PCB), the spacing restrictor is an elastic member, one end of the elastic member is connected to the substrate and the other end of the elastic member has a fixed position relative to the lens group to physically hold up the substrate that makes the relative movement caused by the electromagnetic force.

18. The apparatus as claimed in claim 17, wherein the elastic member is bent into a V-shape, a W-shape or a multi-pleat shape.

* * * * *